(12) United States Patent
Fujii et al.

(10) Patent No.: US 6,405,157 B1
(45) Date of Patent: Jun. 11, 2002

(54) EVALUATION VALUE COMPUTING SYSTEM IN PRODUCTION LINE SIMULATOR

(75) Inventors: Kazunori Fujii; Mamoru Iguchi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/303,558

(22) Filed: May 3, 1999

(30) Foreign Application Priority Data

May 13, 1998 (JP) ............................. 10-129375

(51) Int. Cl.$^7$ ......................... G06F 19/00; G06F 17/60

(52) U.S. Cl. .............................. 703/2; 703/6; 700/100; 700/103

(58) Field of Search ................. 703/2, 6, 17; 700/96, 700/99, 100, 103, 107; 709/102, 106

(56) References Cited

U.S. PATENT DOCUMENTS

| | | | | |
|---|---|---|---|---|
| 4,827,423 A | * | 5/1989 | Beasley et al. | 700/96 |
| 5,544,348 A | * | 8/1996 | Umeda et al. | 703/17 |
| 5,993,041 A | * | 11/1999 | Toba | 700/99 |

FOREIGN PATENT DOCUMENTS

| | | |
|---|---|---|
| GB | 2 295 471 A | 5/1996 |
| JP | 7-129677 | 5/1995 |
| JP | 9-198368 | 7/1997 |

OTHER PUBLICATIONS

Kouikoglou et al., V.S. An Exact Efficient Discrete–Eevent Model for Production Lines with Buffers, Proceedings of the 28th IEEE Conference on Decision and Control, 1989, pp. 65–70.*

Kouikoglou et al., V.S. An Exact Discrete–Event Model and Control Policies for Production Lines with Buffers, IEEE Transactions on Automatic Control, vol. 36, No. 5, May 1991, pp. 515–527.*

Schunk, D. Modeling with the Micro Saint Simulatiion Package, Proceedings of the 2000 Winter Simulation Conference, vol. 1, pp. 274–279.*

Huff, K. Process Management Through Process Modeling and Simulation, Proceedings of the 10th International Software Process Workshop, 1996, Process Support of Software Product Lines, pp. 83–85.*

(List continued on next page.)

*Primary Examiner*—Russell Frejd
(74) *Attorney, Agent, or Firm*—McGinn & Gibb, PLLC

(57) ABSTRACT

In a production line simulator, an evaluation value of parameter adapted for real data (standard time as a processing period in processing a certain product by a certain production facility through a certain production process) computed at high reliability. From event reported from each production facility in a production line, a process period of the certain product by the certain production facility through the certain production process is derived for deriving the evaluation value on the basis of the derived process period. For deriving the evaluation value, an accumulated data in a is sorted sequential order of values. Then, a first center value is determined on the basis of result of sorting, and data on which an absolute value of a difference with the first center value becomes smaller is detected. A zone where number of the data to be detected exceeds half of all data number, is set. Then a new second center value of data is derived within the set zone, for comparing a difference between the second center value and the first center value with a convergence judgment reference value preliminarily set close to zero and determining whether the second center value can be regarded as the evaluation value on the basis of result of comparison. By this the evaluation value well reflecting distribution condition of live data can be obtained.

11 Claims, 9 Drawing Sheets

OTHER PUBLICATIONS

Kouikoglou et al., V.S. Discrete Event Modeling and Optimization of Unreliable Production Lines with Random Rates, IEEE Transactions on Robotics and Automation, vol. 10, No. 2, Apr. 1994, pp. 153–159.*

Song et al., A.H. FMS's Scheduling by Colored Petri Net Model and Hopfield Neural Network Algorithm, Proceedings of the 34th SICE Annual Conference, SICE '95, International Session, pp. 1285–1290.*

Fujii et al., S. A Basic Study on Autonomous Characterization of Square Array Machining Cells for Agile Manufacturing, Proceedings of the 2000 Winter Simulation Conference, vol. 2, pp. 1282–1289.*

Suwa et al., H. Acquisition and Refinement of Scheduling Rules for Job Shop Problems, IEEE International Symposium on Industrial Electronics, 1998, ISIE '98, pp. 720–725.*

Vaario et al., J. Factory Animation by Self–Organization Principles, Proceedings of the International Conference on Virtual Systems and Multimedia, 1997, VSMM '97, pp. 235–242.*

British Search Report dated Dec. 17, 1999.

* cited by examiner

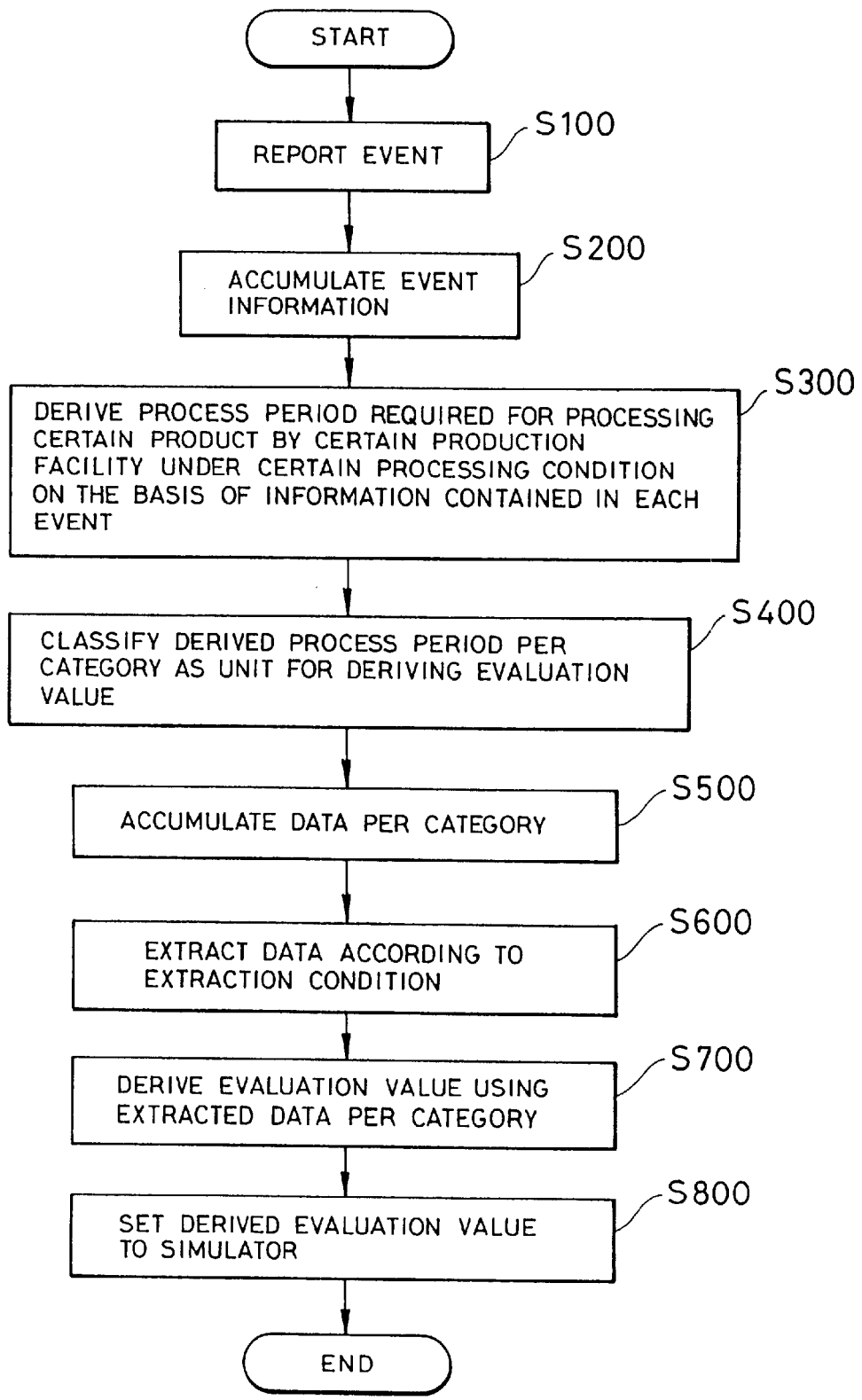

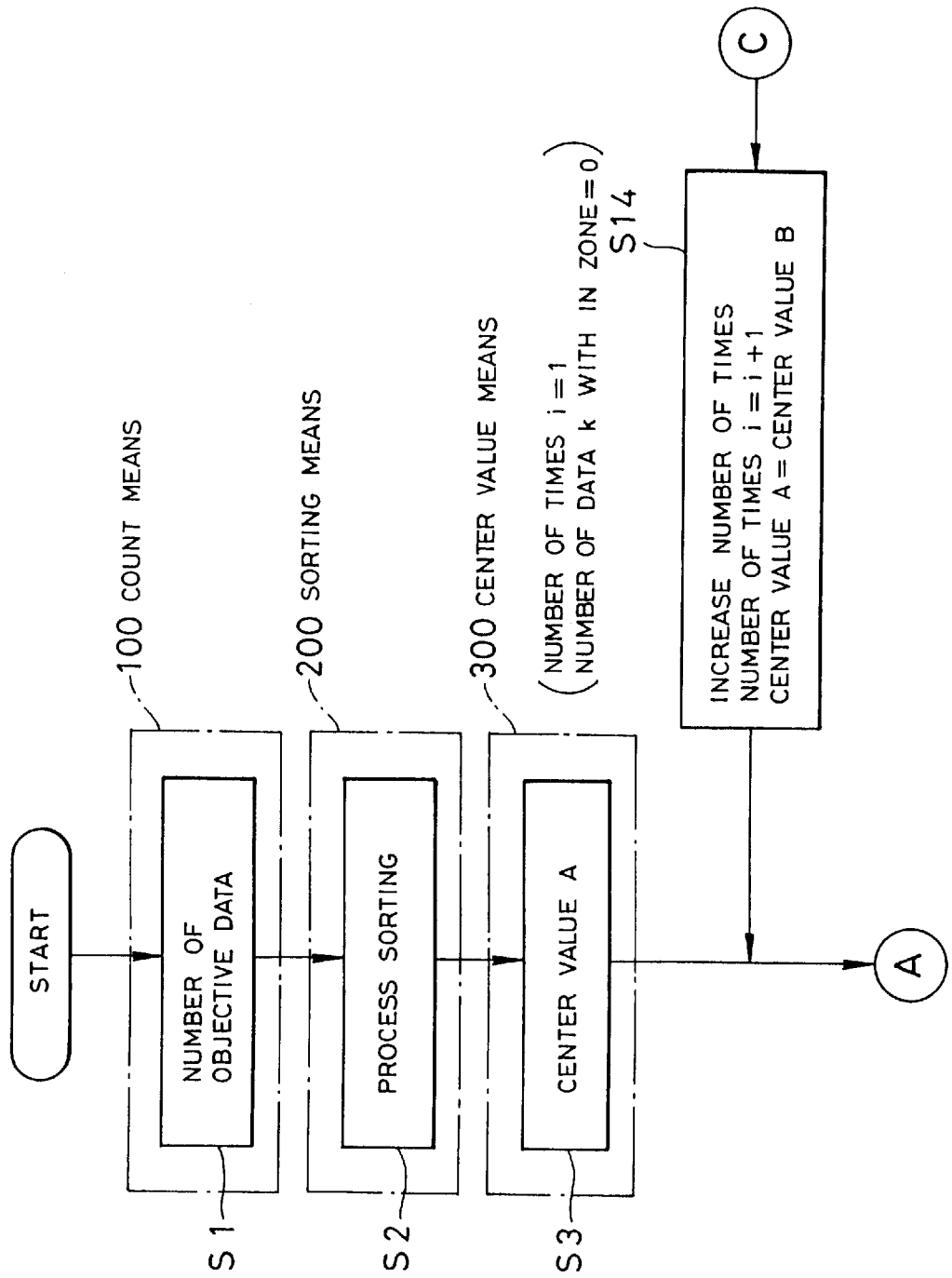

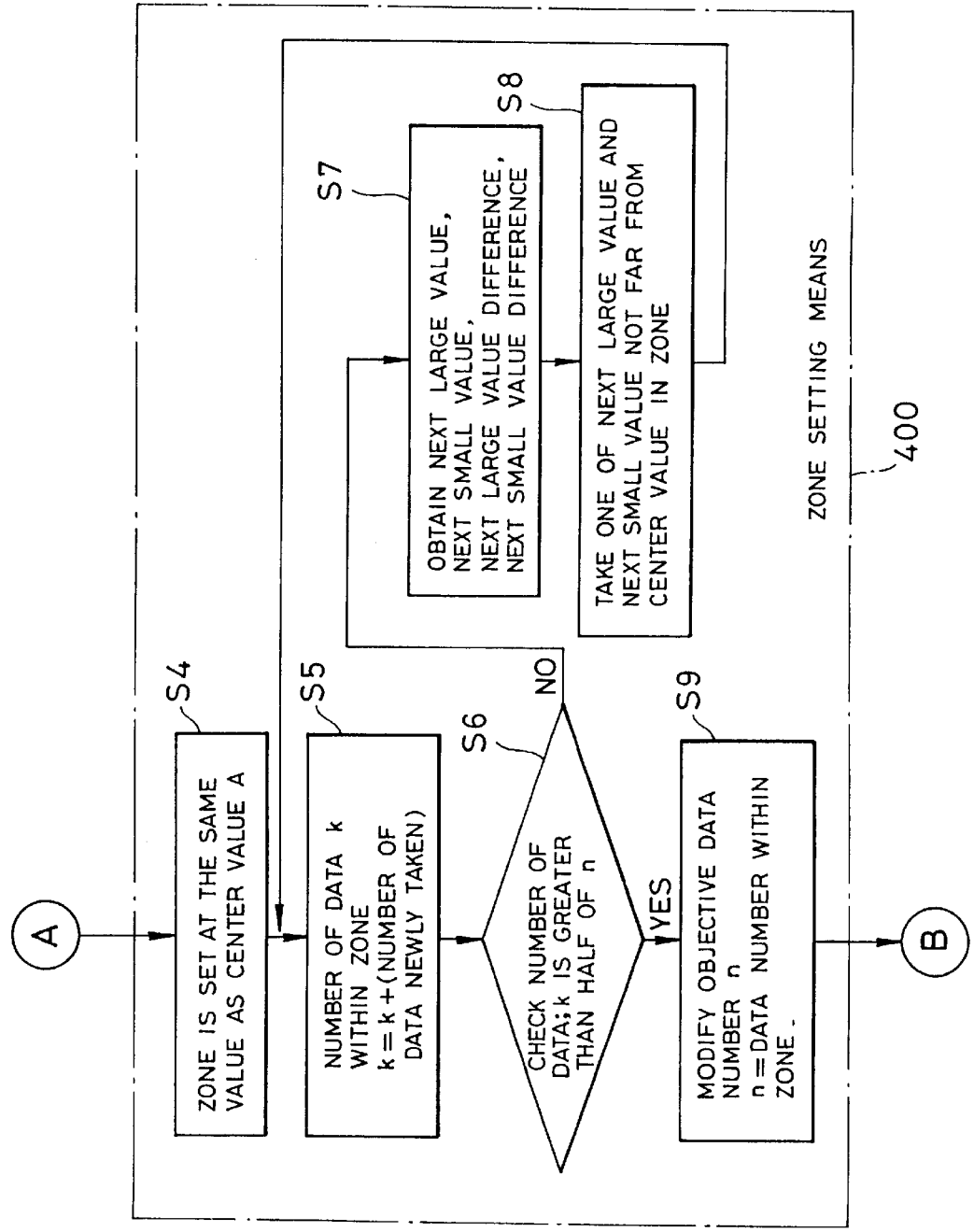

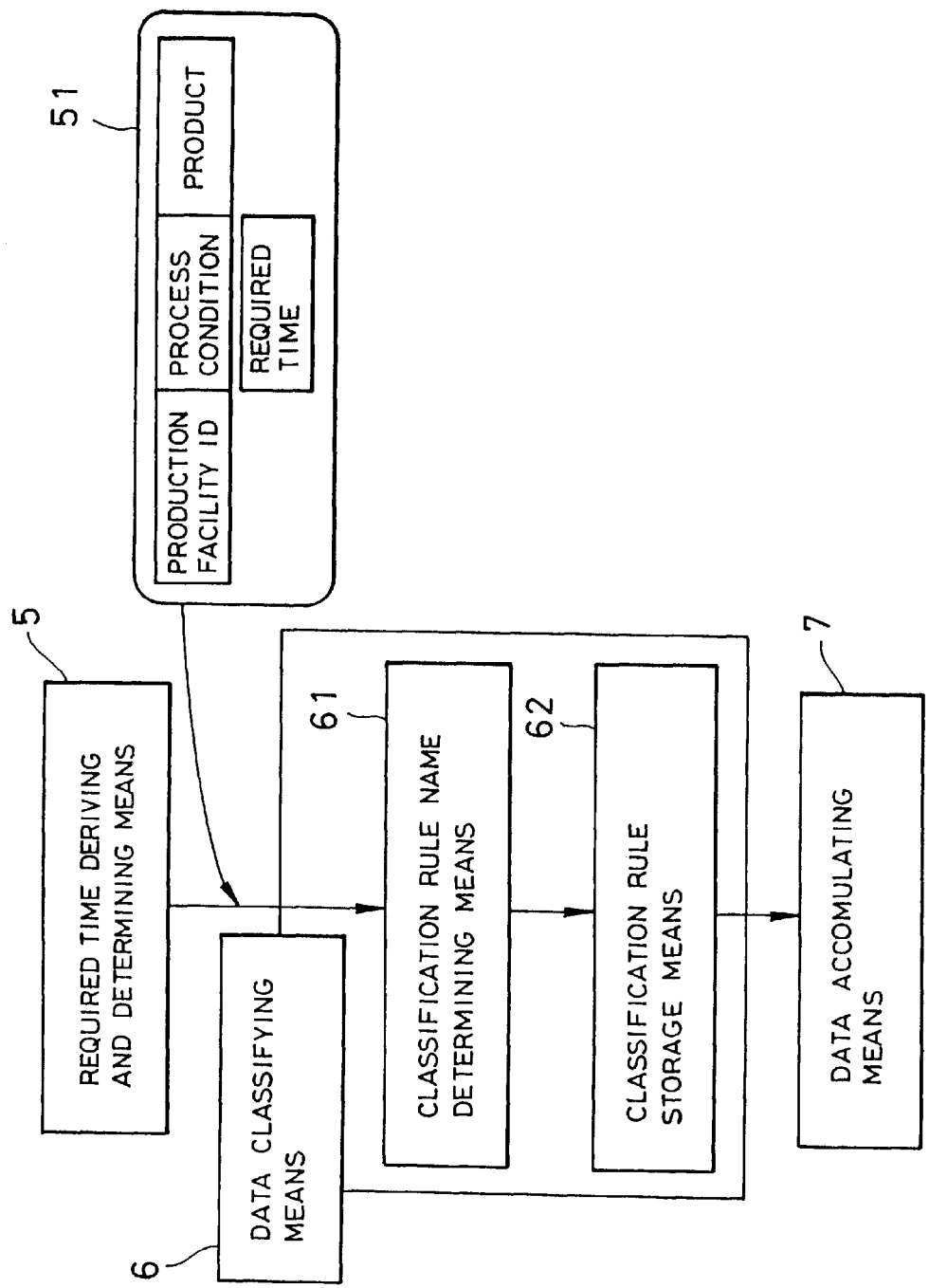

FIG.5

| PRODUCTION FACILITY ID (6D) | CLASSIFICATION RULE NAME (6B) | EXTRACTION CONDITION (8A) |
|---|---|---|
| DEFAULT | CASE 0 | PAST 90 DAYS |
| A A A 0 1 | CASE 1 | — |
| A A A 0 2 | CASE 2 | — |
| B B B 0 1 | — | — |
| B B B 0 2 | — | — |
| B B B 0 3 | CASE 3 | AFTER DECEMBER 2, 1997 |
| C C C 0 1 | CASE 2 | AFTER DECEMBER 2, 1997 |

FIG.7

| CATEGORY | PRODUCTION FACILITY GROUP NAME | PROCESS CONDITION GROUP NAME | PRODUCT NAME | PROCESS TIME (MINUTE) | PROCESS PERIOD EVENT OCCURRING TIME |
|---|---|---|---|---|---|
| I | MACHINE "C" | OPERATION "E" | PRODUCT "X" | 10<br>13<br>12<br>10<br>11<br>... | 10/1/1999  13:05:21<br>10/1/1999  21:10:17<br>12/1/1999   7:22:45<br>15/1/1999  18:34:10<br>16/1/1999   5:57:03 |
| II | MACHINE "C" | OPERATION "F" | PRODUCT "X" | 15<br>13<br>14<br>12<br>18<br>... | 11/1/1999  15:17:55<br>13/1/1999   2:20:01<br>15/1/1999   9:01:41<br>16/1/1999  20:09:58<br>17/1/1999   0:27:36 |
| III | MACHINE "D"<br>.... | OPERATION "F"<br>.... | PRODUCT "X"<br>.... | 11<br>13<br>12<br>12<br>13<br>.... | 10/1/1999   6:39:11<br>11/1/1999  14:04:17<br>13/1/1999  10:31:49<br>15/1/1999   1:49:07<br>16/1/1999  23:49:26<br>... |

EVALUATION VALUE COMPUTING SYSTEM IN PRODUCTION LINE SIMULATOR

BACKGROUND OF THE INVENTION

1. Field of the Invention

The present invention relates generally to an evaluation value computing system in a production line simulator. More particularly, the invention relates to a method for determining a parameter to be set in a simulator in a production line simulation.

2. Description of the Related Art

Conventionally, when a simulation of a production line is used, modeling of a current line is performed. In modeling of the production line, parameters to be set in a model are determined on the basis of experience and/or prediction of an operator responsible for setting the parameters. In the alternative, a method to determine the parameters on the basis of collected performance data has also been known.

Here, as parameters to be set in the simulator, a time required in process in each production step of the production line, a time requiring for preparation for the process, a time for constraining a production facility, tool, and worker, a time required for transporting a product to a next process step after completion of operation in each production step, a time required for moving the tool and/worker and so forth are known as important parameters. These times are generally referred to as "standard time".

Upon implementation of the production line simulation, a value representative of how long a product in question constrains a production facility in question when the product is processed in the production facility, namely the "standard time" is important factor determining reliability of a result of simulation. Since the "standard time" significantly influences for the result of simulation, the "standard time" may also be referred to as "evaluation value".

The "standard time" as the evaluation value fluctuates significantly depending upon process condition, amount of products and so forth. Therefore, it is determined or derived by the method set forth above on the basis of time-series information of past events occurred in the factory and set as one of parameter in the production line simulation. Such determination or derivation method utilizes one of or combination of an average value, a maximum value, a minimum value, a center value, a most frequent value and dispersion, or a value derived by the foregoing method and fluctuation assuming normal distribution.

In Japanese Unexamined Patent Publication No. Heisei 7-129677, a method of deriving the evaluation value from a production performance data by means a reference data generating means is employed. On the other hand, in Japanese Unexamined Patent Publication No. Heisei 7-45490, when a difference between the simulation result and performance is large, for a parameter having large dispersed value, a method of automatically re-deriving a value is employed. Furthermore, while not employed in the simulation, as a method of deriving the evaluation value reflecting a distribution, there is a derivation method employing histogram.

A first problem is that when. the evaluation value derived by the conventional method is set, difficulty is caused in matching the simulation result and the performance. The reason is that the evaluation value derived by the conventional method is not appropriate for representing its parameter, in practice. Namely, the reason is that the conventional method is established under a premise that the distribution of the performance data is symmetric or normally distributed. In practice, distribution of the data is irregular shape and contains large number of abnormal value. As a result, in order to obtain simulation result adapted to performance, adjustment of parameter with huge amount of process steps with human judgment is required.

Even in the method disclosed in Japanese Unexamined Patent Publication No. Heisei 7-45490, it cannot be adapted to the case where a plurality of evaluation values are not certain. Furthermore, in order to determine one evaluation value, simulation has to be performed for many times. In simulation of the production line, it has been know that the final simulation result should fluctuate significantly if the evaluation value of the primary one of production facility is not certain. This appears more significantly in a semiconductor fabrication line.

A second problem is that when an abnormal value is contained in the data as objective for analysis in the conventional method, the evaluation value should be affected significantly by the abnormal value unless the abnormal value is removed preliminarily. Therefore, a logic for eliminating the abnormal value has to be preliminarily prepared. On the other hand, there is no means for definitely determining a range of the abnormal value other than that setting by human experience.

A third problem is to take a long period until execution of reliable simulation utilizing a method reflecting the conventional distribution in order to derive the evaluation value. The reason is that, in the method of the conventional histogram reflecting distribution, there is no simple means for determining a unit width of the histogram and where to start the initial value, and it takes a long period for computing process to require huge amount of time for obtaining a final evaluation value.

A fourth problem is that, particularly in the semiconductor fabrication, it becomes necessary to review once derived evaluation value for frequent occurrence of fluctuation of mixing of product class, addition of new production facility, expansion or modification of condition. Then, set parameter has to be adjusted with huge amount of process step at every occasion of reviewing.

SUMMARY OF THE INVENTION

It is therefore an objection of the present invention to provide a simulation model by deriving an evaluation value of parameter adapted to a real data, an evaluation value computing system on a line simulator of a production line, which can obtain realistic simulation result, and an evaluation value computing method.

According to the first aspect of the present invention, an evaluation value computing system in a production line simulator for computing a standard time of a product processing period as an evaluation value, which is set in a production facility model to be used in the production line simulation and represents a period for constraining state of the production facility for production process or preparatory work for production process, comprises:

event reporting means for reporting event occurring in the production facility;

required time deriving and determining means for deriving and determining a required time required for production process in the production facility on the basis of a reported event, and accumulating the required time as data; and evaluation value computing means for deriving the standard time on the basis of the accumulated data, the evaluation value computing means including:

sorting means for sorting the accumulated data in a sequential order of values, center value means for deriving a first center value on the basis of result of sorting;

zone setting means for detecting data on which an absolute value of a difference with the first center value becomes smaller and setting a zone where number of the data to be detected exceeds half of all data number, and evaluating means for deriving a new second center value of data within the set zone, comparing a difference between the second center value and the first center value with a convergence judgment reference value preliminarily set close to zero and determining whether the second center value can be regarded as the evaluation value on the basis of result of comparison.

In the preferred construction, the evaluation value computing means may repeatedly operate the zone setting means and the evaluation means until the difference becomes smaller than the convergence judgement reference value when the difference between the second center value and the first center value is greater than the convergence judgement reference value.

The evaluation value computing system may further comprise data classifying means for classifying data determined by the required time deriving and determining means into a computing unit of the evaluation value depending upon production facilities, product processing conditions and products. Also, the evaluation value computing system may further comprise extraction means for narrowing down objective data for deriving the evaluation value in time among accumulated data. Furthermore, the evaluation value computing system may further comprise evaluation value setting means for setting the derived evaluation value to the production line simulator.

According to the second aspect of the present invention, an evaluation value computing method in a production line simulator for computing a standard time of a product processing period as an evaluation value, which is set in a production facility model to be used in the production line simulation and represents a period for constraining state of the production facility for production process or preparatory work for production process, comprises:

event reporting step of reporting event occurring in the production facility;

required time deriving and determining step of deriving and determining a required time required for production process in the production facility on the basis of a reported event, and accumulating the required time as data; and evaluation value computing step of deriving the standard time on the basis of the accumulated data, the evaluation value computing step including:

sorting step of sorting the accumulated data in a sequential order of values, center value step of deriving a first center value on the basis of result of sorting;

zone setting step of detecting data on which an absolute value of a difference with the first center value becomes smaller and setting a zone where number of the data to be detected exceeds half of all data number, and evaluating step of deriving a new second center value of data within the set zone, comparing a difference between the second center value and the first center value with a convergence judgment reference value preliminarily set close to zero and determining whether the second center value can be regarded as the evaluation value on the basis of result of comparison.

Preferably, in the evaluation value computing step, the zone setting step and the evaluation step may be repeated until the difference becomes smaller than the convergence judgement reference value when the difference between the second center value and the first center value is greater than the convergence judgement reference value.

The foregoing method may further comprise data classifying step of classifying data determined by the required time deriving and determining step into a computing unit of the evaluation value depending upon production facilities, product processing conditions and products. The method may further comprise extraction step of narrowing down objective data for deriving the evaluation value in time among accumulated data. Also, the method may further comprise evaluation value setting step of setting the derived evaluation value to the production line simulator.

According to the third aspect of the present invention, a storage medium storing a control program for an evaluation value computing method in a production line simulator for computing a standard time of a product processing period as an evaluation value, which is set in a production facility model to be used in the production line simulation and represents a period for constraining state of the production facility for production process or preparatory work for production process, the evaluation computing method comprises:

event reporting step of reporting event occurring in the production facility;

required time deriving and determining step of deriving and determining a required time required for production process in the production facility on the basis of a reported event, and accumulating the required time as data; and evaluation value computing step of deriving the standard time on the basis of the accumulated data, the evaluation value computing step including:

sorting step of sorting the accumulated data in a sequential order of values, center value step of deriving a first center value on the basis of result of sorting;

zone setting step of detecting data on which an absolute value of a difference with the first center value becomes smaller and setting a zone where number of the data to be detected exceeds half of all data number, and evaluating step of deriving a new second center value of data within the set zone, comparing a difference between the second center value and the first center value with a convergence judgment reference value preliminarily set close to zero and determining whether the second center value can be regarded as the evaluation value on the basis of result of comparison.

Discussing in connection with the operation of the present invention set forth above, the required period necessary for performing production process in the production facility is derived and determined on the basis of event occurring timing, event receiving timing or state continuing period contained in the event from the event reported from each production facility of the production line. The required period thus determined is accumulated as data. Then, the "standard time" as evaluation value is derived from the accumulated data. As a method for deriving the evaluation value, the accumulated data is sorted in sequential order of values. Then, from the result of sorting, the first center value is derived. Then, data on which an absolute value of a difference with the first center value becomes smaller is detected. A zone is then set so that number of the data to be detected exceeds half of all data number. The new second center value of the data within the set zone is derived. The difference between the second center value and the first center value is compared with a preliminarily set reference value which is set close to zero to determine whether the second center value can be regarded as the "standard time" as the evaluation value. Thus, the evaluation value, namely the standard time better reflecting the distributing condition of the live data can be obtained to provide higher reliability for the result of the production line simulation.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 2 is a flowchart showing general operation of the preferred embodiment of an evaluation value computing system in a production line according to the present invention;

FIGS. 3A to 3C are flowcharts showing a detail of an evaluation value computing method at step S700 of FIG. 2;

FIG.4 is a block diagram showing a preferred construction of data classifying means 6;

FIG. 5 is an illustration showing an example of a comparison table between a facility ID of classification rule name determination means 61 and classification rule name;

FIG. 7 is an illustration showing an example of accumulation data in data accumulation means 7.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
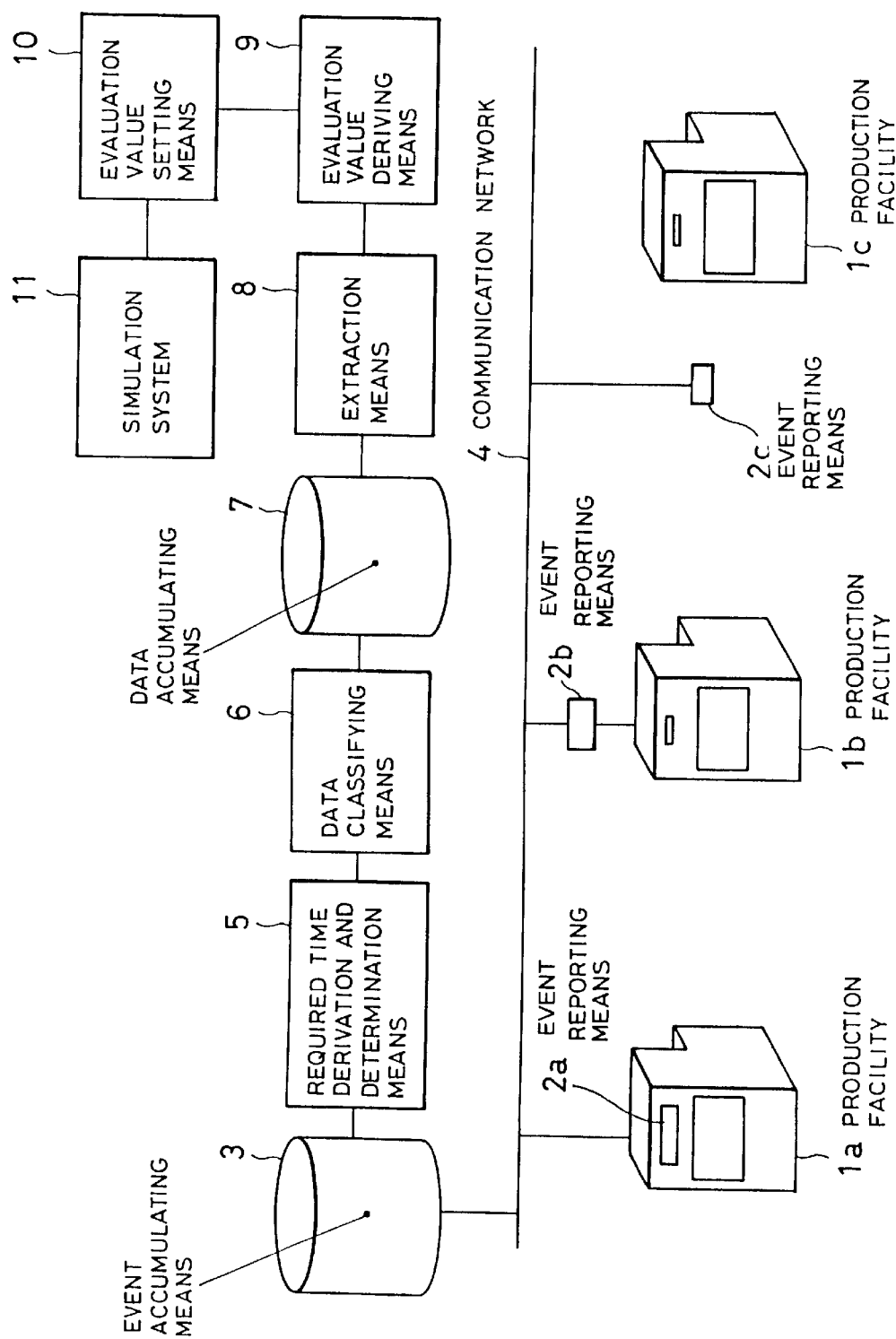
FIG. 1 is a block diagram showing a construction of the preferred embodiment of an evaluation value computing system in a production line according to the present invention.

In the shown embodiment set forth below, discussion will be given in terms of one example of the case where a time (namely "standard time"), in which a certain product is constrained on a production facilitate in a production line, is determined. Referring to FIG. 1, a plurality of production facilities 1a to 1c are connected through a communication network 4 to form a production line. Event reporting means 2a to 2c are provided corresponding to the production facilities 1a to 1c for reporting respective events of the corresponding production facilities 1a to 1c. Event accumulating means 3 is adapted to accumulate respective events reported from the event reporting means 2a to 2c.

Required time derivation and determination means 5 derives and determines a process time on the basis of information accumulated in the event accumulating means 3 for outputting kind name of the product, process condition and production facility ID (identification number) together with the process period. Data classifying means 6 retrieves a correspondence table (see 6D and 6B of FIG. 5) of the production facility ID and the classification rule name with taking the production facility ID from the required time derivation and determination means 5 as a key for retrieval to obtain the classification rule name. Data accumulating means 7 accumulates process time information together with occurrence time of the event according to the rule corresponding to the classification rule name.

Extraction means 8 extracts information corresponding to a predetermined extraction condition (see 8A of FIG. 5) among information accumulated in data accumulating means 7. Evaluation value deriving means 9 performs derivation process according to process flows of FIGS. 3A to 3C using information extracted in the extraction means 8, and finally derives "standard time" as the evaluation value. Evaluation value setting means 10 sets evaluation value thus determined as parameter to a simulation system 11 of a production line.

In the construction set forth above, operation of the shown embodiment will be discussed with reference to a process flow illustrated in FIG. 2. From each of the production facility 1a to 1c, information, such as a process start time, a process end time, a production facility ID, a worker name, a kind and a production process step number and so forth at each production process step of all products is reported by each event reporting means 2a to 2c as operation start event, upon initiation of operation in each process (step S100). Similarly, operation end event is reported at end of operation. These reported events are accumulated in the event accumulating means 3 (step S200).

Here, the event reporting means 2a to 2c may be included or not included in each production facility. The production facility 1a is illustrated as incorporating the event reporting means 2a. Both of the event reporting means 2b and 2c are respectively provided outside of the production facilities 1b and 1c. The event reporting means 2c is connected to the production facility 1c in radio. However, the event reporting means 2c may be a keyboard device in which data are input by an operator. The event reporting means 2b and 2c are physically connected to event accumulation means 3 through a network, such as local area network (LAN). However, similar connection between the event reporting means 2b and 2c and the event accumulating means 3 may also be connected through a radio network.

Subsequently, from information accumulated in the event accumulating means 3, the process period taken in process of certain product by a certain facility under a certain condition is determined by the required time derivation and determination means 5 (step S300). For example, a difference between a reception time of the operation start event and a reception time of the operation end event is the required time in the process of the certain product. However, the required time may also be derived using a time contained in an event message or using a continuation time contained in the event message. On the other hand, a time to be constrained on the production facility may be derived using other event, such as transportation events, including loading of the product to the production facility or removal of the product from the production facility.

Since a method for deriving the repuierd time is determined according to the product facility, a table which shows relations between deriving method and product facilities, is provided. The table is retrieved with taking the ID of the product facility which has reported the event as retrieving key to be determined the corresponding deriving method.

Here, as information obtained from the required time derivation and determination means 5, as shown by a reference numeral 51 in FIG. 4, at least the product name of the certain product, the production facility ID performing production process of the product, the process condition and the required time thereof are included.

Next, by the data classifying means 6, the evaluation value is classified into category as unit of derivation (step S400). Referring to FIG. 4, data classifying means 6 includes classification rule name determining means 61 for determining what classification method is to be used, and classification rule storage means 62 for preliminarily storing particular classification methods of the determined classification rule name 6B (see FIG. 5).

Here, in the classification rule determining means 61, correspondence table of the production facility ID 6D and The classification rule name 6B as shown in FIG. 5 is provided. Also, the classification rule name 6B corresponding to "default" is set. The correspondence table is retrieved with taking the production facility ID 6 as a key. The classification rule corresponding to the certain production facility ID 6D in certain sequential order, as retrieval key. When the retrieval key is the production facility not corresponding to the production facility ID 6D of the correspondence table, the classification rule name corresponding to "default" is used.

On the other hand, it is also possible to use a wild card or turned letter, to take a combination of a production facility group and the production facility as a code system expressing the production facility ID 6D, to prepare a "default" rule with the production facility group, to use the rule per each individual production facility if setting is present in the facility and to use the rule set by the production facility group if the setting is not present in the facility.

Here, discussion will be given for meaning of definition of "default". There are some production facility in which performance of the production facility is more than sufficient, no difference will be caused even with uniform definition, or little influence is caused in the simulation result even with setting the classification in detail. Therefore, for such production facility, the classification rule different from the classification rule of other production facility is applied. Therefore, "default" is used.

Figure 6:
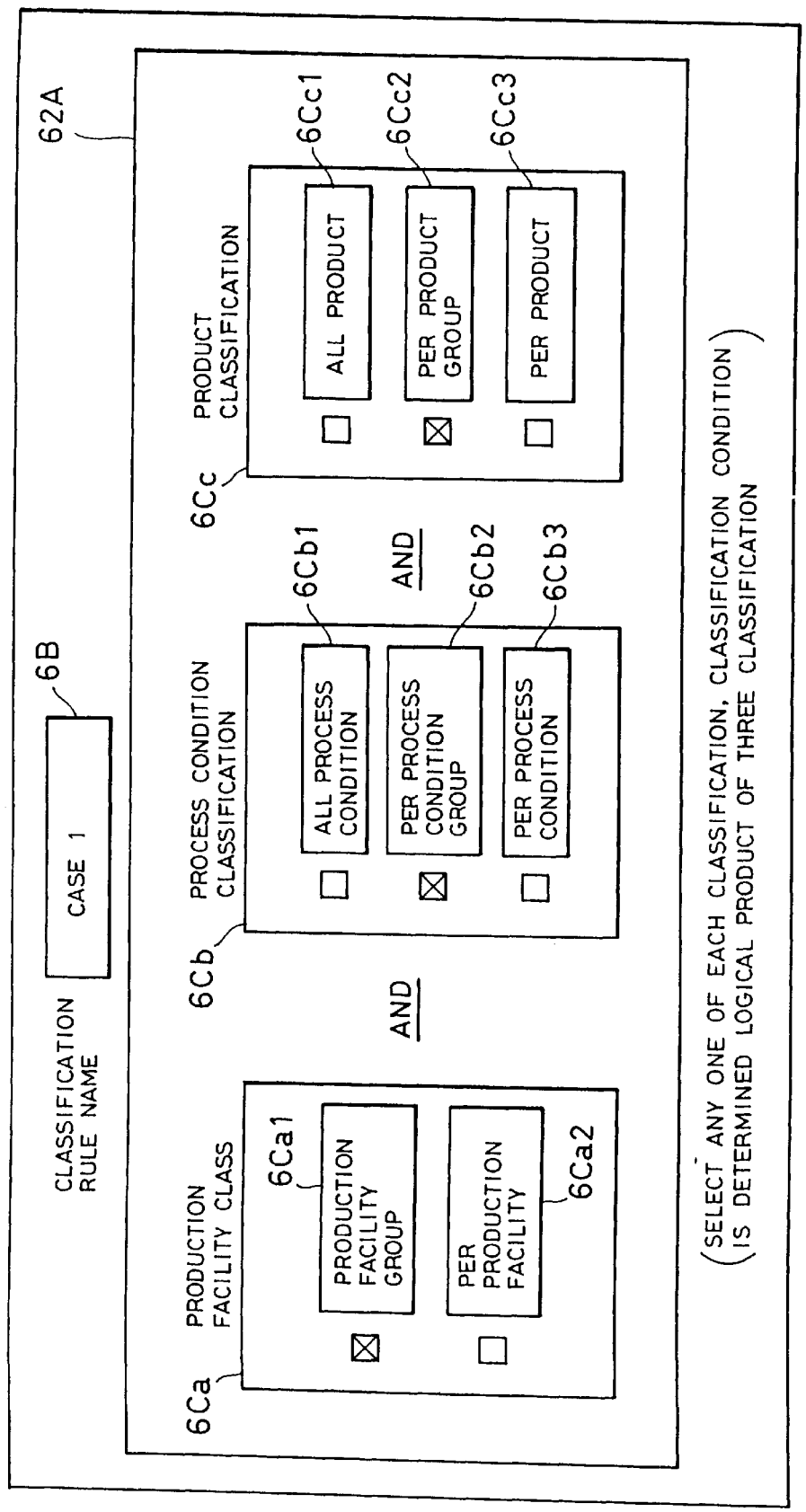
FIG. 6 is an illustration showing an example of classification rule 62.

At first, by the classification rule name determining means 61, the classification rule name 6B is determined from the facility ID 6D included in the information 51 (see FIG. 4) obtained by the required time derivation and determination means 5. In the classification rule storage means 62, classification rules "CASE 0" to "CASE n" are preliminarily stored. Referring to FIG. 6 showing detail of the classification rule name "CASE 1", in the classification rule 62A set per the classification rule name 6B, there are three kinds of classification, i.e. production facility classification 6Ca, process condition classification 6Cb and product classification 6Cc. The classification method is determined by combining three kinds of classification.

As the production facility classification 6Ca, either per production facility group 6Ca1 or per production facility 6Ca2 is set. As the process condition classification 6Cb, one of all process condition 6Cb1, per process condition group 6Cb2, per process condition 6Cb3 is set. As the production classification 6Cc, one of all products 6Cc1, per product group 6Cc2, per product 6Cc3 is set.

Discussion will be given for respective classification (production facility classification 6Ca, process condition classification 6Cb, product classification 6Cc) for classification of category as a derivation unit of the "standard time" as the evaluation value. At first, the following is the reason why the production facility classification 6Ca classifies into two units of per production facility group 6Ca1 and per production facility 6Ca2. It is possible that a plurality of production facilities which can perform the same process are present, these facilities are from different makers, even when these facilities are from the same maker, facilities have different report timings of the event message of the same operation record. In such case, if it is not necessary to individually set the evaluation value per the facility, per production facility group 6Ca1 regarding that all facilities are the same, is selected as the facility classification. On the other hand, when it is preferred to handle as particular facility, per production facility 6Ca2 is selected as the production facility classification 6Ca.

Next, discussion will be given for the process condition classification 6Cb, in the unit (per production facility group 6Ca1 or per production facility 6Ca2) selected in the production facility classification 6Ca, if it is possible to consider as the same process time at any process condition (for example, the case in the measurement process, at the same number of measurement, where the processes are substantially the same while measurement position is different), all process condition 6Cb1 is selected.

On the other hand, in the unit (per production facility group 6Ca1 or per production facility 6Ca2) selected in the production facility classification 6Ca, if the process can be regarded as equivalent while different in detail, per process condition group 6Cb2 is selected. As an example of this case, ID showing the process condition or a part of detail match, there is a method to preliminarily prepare a table of the processes to be regarded equivalent.

Furthermore, in the unit (per production facility group 6Ca1 or per production facility 6Ca2) selected in the production facility classification 6Ca, if the classification has to be set per the process condition, per process condition 6Cb3 is selected.

Finally, concerning the product classification 6Cc, it can be considered to be similar to the case of the process condition classification 6Cb set forth above. The reason why classification is made for three units as set forth above, even if the production facilities are equivalent and the process condition are equivalent, when apparent difference is caused in the "standard time", a unit in collection of data has to be divided. Here, the reason why the process condition classification 6Cb and the product classification 6Cc are provided independently, is that the process time can be different depending upon production name even under the same designation of the process condition. Such difference may be caused for significant difference of process areas depending upon products in the production facility which terminates operation by automatically detecting completion of process, or for difference of the process period depending upon the products even under the same preliminarily designated process condition.

The product group of the certain product may be determined by separately providing setting table or using wild card or turned letter. On the other hand, the process condition group of certain process condition is also determined in the similar manner. The classification condition is determined by AND condition of these three classification conditions.

From the foregoing, when the certain product is processed by the production facility of certain sequential order and certain process condition, data determined by the required time derivation and determination means 5 is generated, the data thus generated is classified into the categories as the unit to derive the evaluation value, by the classification means 6. This classification is grouping of the required time under the condition to be considered to be equivalent. For example, the process times can be grouped into one group in the case where a plurality of production facilities are present but difference between the production facilities is nor required to consider, or the process period can be grouped into one group when the process conditions can be considered as same even if the product or process steps are different. The obtained data is accumulated in the data accumulating means 7 (step S500).

Next, data for deriving the evaluation value is designated by the extraction means 8. The data extraction condition is set corresponding to respective production facility ID as extraction condition 8A in the correspondence table between the production facility ID 6D shown in FIG. 5 and the classification rule name 6B, in the classification rule name determining means 61. The extraction condition corresponding to "default" is set as past days as shown in FIG. 5. When past days or start date and time is set per each production facility, data is extracted by the set extraction condition. On the other hand, the extraction condition is not set, data is extracted by the extraction condition corresponding to "default" (step S600).

It should be possible that number of data obtained in the past based on a period from the most recent one or start day and time and number of data may be designated in placed of the past days. On the other hand, it is also possible to provide extracting condition table per production facility or per classification unit in the extraction means 8.

An example of derivation of time of the production process in each production process step will be discussed. In the information accumulated in the event accumulating means 3, information, such as the process start time, the process end time, the process condition, the process facility ID, the worker, the kind, the process step number or so forth in each process step of all products, is included. In the required time derivation and determination means 5, a period from the process start time to the process end time is judged as the process time. The process time and information including the kind name, the process condition, the process facility ID are fed to the data classification means 6.

In the data classification means 6, the correspondence table shown in FIG. 5 is retrieved with taking the process facility ID as the retrieving key to obtain the corresponding classification rule name. The classification rule shown in FIG. 5 corresponding to the classification rule name is read out from the classification rule storage means 62. Then, the process time information is accumulated in the data accumulating means 7 together with the event occurring time according to the classification rule.

Assuming that the classification rule of the process period is as illustrated in FIG. 6, the process time is classified into the category (unit for deriving the evaluation value) per combination of the production facility group, the process condition group and product name group. Namely, when any one of the production facility group, the process condition group and the product group name is different, it is classified into different category. In case of data according to the classification rule shown in FIG. 6, data in the form shown in FIG. 7 is accumulated in the data accumulating means 7.

Then, in the extraction means 8, from data group of the form of FIG. 7 accumulated in the data accumulating means 7, data corresponding to the extraction condition shown in FIG. 5 is extracted to output to the evaluation value deriving means 9. In the evaluation value deriving means 9, the "standard time" as the evaluation value is derived per category shown in FIG. 7 (step S700). The derivation method is implemented according to the flows shown in FIGS. 3A to 3C.

Figure 3C:
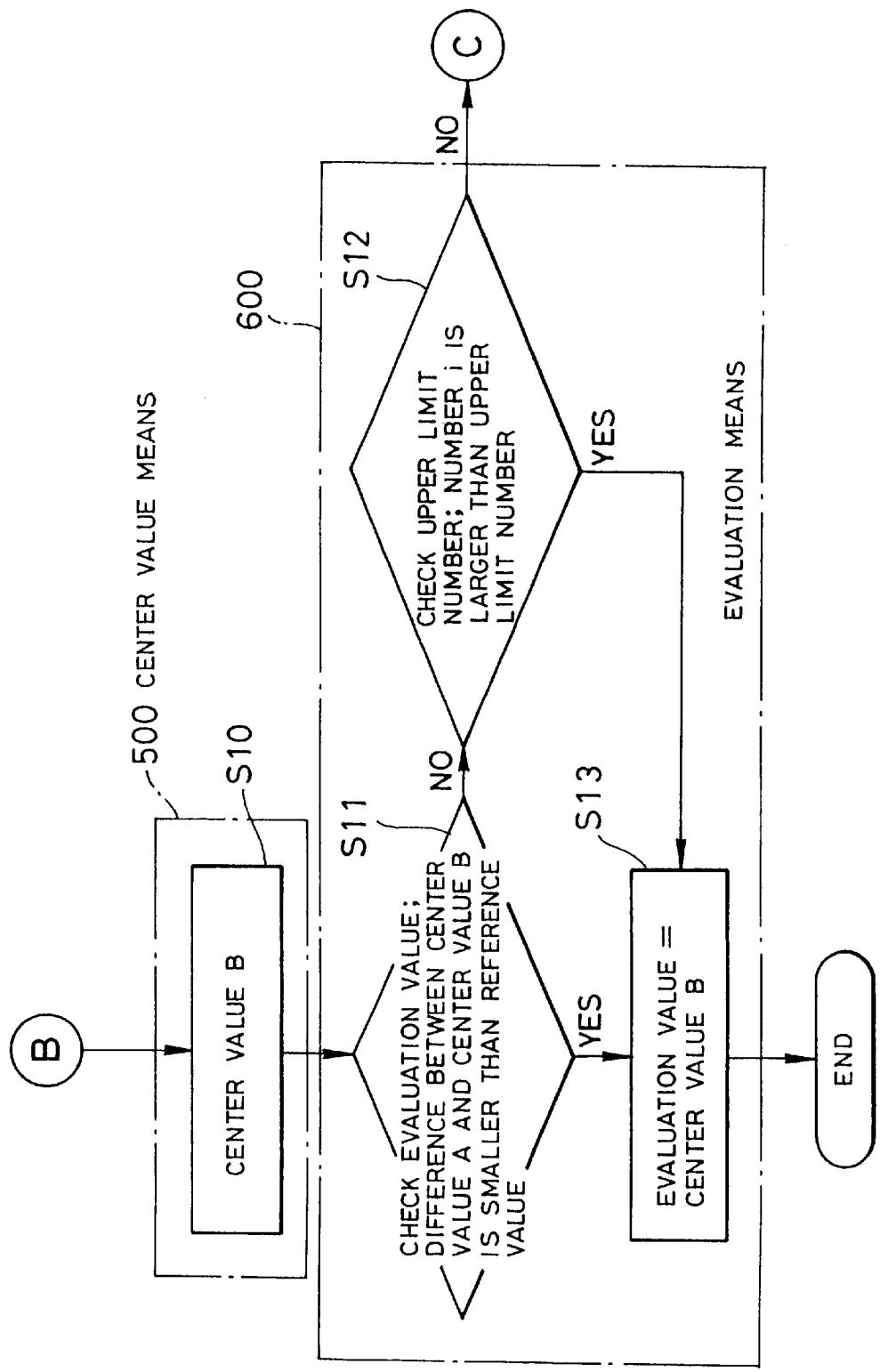

An example of derivation of the evaluation value using the evaluation value deriving means 9 from data obtained through the foregoing process will be discussed with reference to the flowcharts shown in FIGS. 3A to 3C. Number of data n in the category (see FIG. 7) to be an object is derived by counting means 100 (step S1). Next, sorting process of the data by sequential order of numerical value by sorting means 200 (step S2). Here, while discussion will given for an example (ascending order) from small value to large value, it is also possible to sort from large value to small value (descending order).

Subsequently, by center value means 300, a result of sorting, value of the center data among all data number is derived (step S3). If all data number is odd number, the value at the center is taken as the center value (candidate value) A. On the other hand, if all data number is even number, an average value of values of two data is taken as the center value (candidate value) A.

Then, zone including the center value A is set by zone setting means 400 (step S4). As an example of setting of zone, data with which absolute value of differences with the center value A become smaller, is detected to determine a zone where number of detected data becomes smaller half of all data number. Setting method of the zone will be discussed.

At first, the zone is consisted of the same value as the center value A and number of data included in the zone is taken as a number of data k within the zone. If the number of data k within the zone is in excess of half of all data number, the center value A as the candidate value becomes the evaluation value. On the other hand, if the number of data k does not exceed half of the all data number, a next large value which is next larger than the center value A, and a next small value which is next smaller than the center value A, which are not included in the zone, are derived (step S7) Also, a next large value difference as a difference between the center value A and the next large value and a next small value difference as a difference between the center value A and the next small value are derived (step S7).

Data of not larger (smaller) one of the next large value difference and the next small value difference is taken in the zone (step S8). When the data is taken into the zone, number of data to be a taken is added to the number of data in the zone to be a number of data k in the new zone (step S5).

Then, If the number of data k in the new zone is not exceed half of the all data number, the next large value and the next small value not included in the foregoing zone are derived to repeat the process set forth above until the number of data in the zone exceeds half of the all data number. Thus, data is sequentially taken into the zone from those closer to the center value A.

Next, from the data in the zone thus determined, the center value B as new candidate value is derived by the center value means 500 (step S10). Before this, an objective data number n is modified to the number of data within the new zone (step S9). Finally, at an evaluation value judgment step S11, the evaluation means 600 makes judgment that the center value B is the evaluation value B when a difference between the initial center value A and the newly determined center value B is smaller than the predetermined reference value (detail will be discussed later) (step S13).

When the center value B does not become the evaluation value by the evaluation means 600, data in the newly set zone is taken as all data. At this time, the center value A of the objective data is the same value as the center value B. Then, similarly, the new center value B is derived using the zone setting means 400, the counting means 100 and the center value means 500. Similarly, using the evaluating means 600, judgment is made whether the new center value B can be the evaluation value.

By repeating these process, the evaluation value is determined. By setting an upper limit value i of number of times of repetition, if the repetition number does not exceed the upper limit value i as checked at an upper limit repetition number checking step S12, the number of times of repetition is incremented by one (step S14). If the repetition number is in excess of the upper limit value i as checked at the upper limit repetition number checking step S12, the instantaneous center value B is taken as the evaluation value (step S13). The derived evaluation value is reflected in the simulation system 11 by the evaluation value setting means 10.

Here, discussion will be given concerning "reference value" at step S11. In evaluation value deriving process of FIGS. 3A to 3C, processes of steps S4 to S11 are repeated, a difference between the center values A and B as the evaluation value candidates will converge toward the reference value. In this case, as converging value, it is ideal to be close to "0" as much as possible. Therefore, the reference value as the converging value is preferred to be set at a value close to "0".

However, by setting "0" as the reference value, a long period is required in converging process. On the other hand, when a larger value is set as the reference value, ideal evaluation value cannot be obtained. Accordingly, compromising with the number of times of repetition "i" through the process of steps S4 to S11, the reference value is set appropriately.

As set forth above, the reference value is used for making judgment whether the difference between the current evaluation value candidate and the new evaluation value candidate is converged as close as "0". As the result, the reference value can be referred to as convergence judgment reference value.

All of the foregoing process steps set forth above can be executed by loading a program as software in CPU as computer, it is a matter of course that the program can be executed by preliminarily store in a storage medium (not shown), such as ROM or the like.

With the present invention set forth above, the result of simulation can be easily match with the performance value. The reason is that the evaluation value computing method according to the present invention derives the evaluation value reflecting distributing condition of live data.

As a secondary effect of the present invention, the foregoing first effect can be enhanced by using data classification means. The reason is that by grouping the required time under conditions to be regarded as equivalent, cases where a plurality of production facilities are present and difference between the production facility is not required to consider, or where the process conditions are deemed to be the same even if the products or process steps are different, can be grouped into one group. Thus, base data for deriving the evaluation value can be increased to enhance precision of the evaluation value.

A third effect is that handling of data can be simple, since the certain extent of abnormal values included in the live data can be ignored. The reason is that the extreme value can be removed automatically during the process of derivation of the evaluation value.

A fourth effect is that the result of simulation can be obtained in a short period. The reason is that appropriate parameters necessary for initiation of simulation can be derived by combination of simple arithmetic operation.

A fifth effect is that the fourth effect can be enhanced by using data classification means. The reason is that by grouping the required time under conditions to be regarded as equivalent, cases where a plurality of production facilities are present and difference between the production facility is not required to consider, or where the process conditions are deemed to be the same even if the products or process steps are different, can be grouped into one group to delete evaluation value deriving data number and whereby to shorten the time up to execution of simulation.

A sixth effect is that adjustment operation of the parameter can be eliminated even upon performing mixing of the product of the production line, modification of the production facility or process condition, or so forth. The reason is that once a hysteresis data is collected under new condition, the parameter to be set can be obtained from the hysteresis data.

A seventh effect is that the sixth effect can be enhanced by the following matter. By appropriately setting the extraction condition in consideration of a timing of modification of the condition by the extraction means and by omitting data before modification, a period for accumulating the hysteresis data for enabling derivation of the evaluation value can be shortened.

From the foregoing effects, precision in prediction of the line can be constantly maintained at high level, and proper measure can be taken in advance on the basis of the result of simulation. For example, by modification of maintenance timing of the production facility on which increasing of work in process inventory is predicted, by setting of throughput improving target, by increasing of facility capable of the same process, by aiding of production work and by modification of input plan of the production facility, increasing of work in process inventory is expected to avoid.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An evaluation value computing system in a production line simulator for computing a standard time of a product processing period as an evaluation value, which is set in a production facility model to be used in a production line simulation, comprising:

event reporting means for reporting a reported event occurring in a production facility;

required time deriving and determining means for deriving and determining a required time required for a production process in said production facility based on a reported event, and accumulating said required time as accumulated data; and evaluation value computing means for deriving said standard time based on said accumulated data, said evaluation value computing means, including:
sorting means for sorting said accumulated data in a sequential order of values;
center value means for deriving a first center value based on a result of said sorting means;
zone setting means for detecting data on which an absolute value of a difference with said first center value becomes smaller and setting a set zone where a number of said data to be detected exceeds half of all said data, and
evaluating means for deriving a second center value of data within said set zone, comparing a difference between said second center value and said first center value with a convergence judgment reference value preliminarily set close to zero and determining whether said second center value can be regarded as said evaluation value based on a comparative result, wherein said evaluation value represents a period for constraining a state of said production facility for a production process or preparatory work for said production process.

2. An evaluation value computing system as set forth in claim 1, wherein said evaluation value computing means repeatedly operates said zone setting means and said evaluation means until the difference becomes smaller than said convergence judgement reference value when the difference between said second center value and said first center value is greater than said convergence judgement reference value.

3. An evaluation value computing system as set forth in claim 1, which further comprises data classifying means for classifying data determined by said required time deriving and determining means into a computing unit of said evaluation value depending upon production facilities, product processing conditions and products.

4. An evaluation value computing system as set forth in claim 1, which further comprises extraction means for narrowing down objective data for deriving said evaluation value in time among accumulated data.

5. An evaluation value computing system as set forth in claim 1, which further comprises evaluation value setting means for setting said derived evaluation value to said production line simulator.

6. An evaluation value computing method in a production line simulator for computing a standard time of a product processing period as an evaluation value, which is set in a production line facility model to be used in a production line simulation, comprising:
reporting a reported event occurring in said production facility;
deriving and determining a required time required for a production process in said production facility based on said reported event and accumulating said required time as accumulated data; and
computing said evaluation value to derive said standard time based on said accumulated data, said computing said evaluation value, including:
sorting said accumulated data in a sequential order of values,
deriving a first center value based on a result of said sorting;
setting a set zone by detecting data on which an absolute value of a difference with said first center value becomes smaller and setting said set zone where a number of said data to be detected exceeds half of all numbered data, and
evaluating a second center value of data within said zone, comparing a difference between said second center value and said first center value with a convergence judgment reference value preliminarily set close to zero and determining whether said second center value can be regarded as said evaluation value based on a comparative result, wherein said evaluation value represents a period for constraining a state of said production facility for a production process or preparatory work for said production process.

7. An evaluation value computing method as set forth in claim 6, wherein in said evaluation value computing step, said zone setting step and said evaluation step are repeated until the difference becomes smaller than said convergence judgement reference value when the difference between said second center value and said first center value is greater than said convergence judgement reference value.

8. An evaluation value computing method as set forth in claim 6, which further comprises data classifying step of classifying data determined by said required time deriving and determining step into a computing unit of said evaluation value depending upon production facilities, product processing conditions and products.

9. An evaluation value computing method as set forth in claim 6, which further comprises extraction step of narrowing down objective data for deriving said evaluation value in time among accumulated data.

10. An evaluation value computing method as set forth in claim 6, which further comprises evaluation value setting step of setting said derived evaluation value to said production line simulator.

11. A storage medium storing a control program for an evaluation value computing method in a production line simulator for computing a standard time of a product processing period as an evaluation value, which is set in a production facility model to be used in a production line simulation, said evaluation value computing method, comprising:
reporting a reported event occurring in said production facility;
deriving and determining a required time required for a production process in said production facility based on said reported event and accumulating said required time as accumulated data; and
computing an evaluation value to derive said standard time based on said accumulated data, said computing an evaluation value, including:
sorting said accumulated data in a sequential order of values,
deriving a first center value based on a result of said sorting;
setting a set zone by detecting data on which an absolute value of a difference with said first center value becomes smaller and setting said set zone where a number of said data to be detected exceeds half of all numbered data, and
evaluating a second center value of data within said set zone, comparing a difference between said second center value and said first center value with a convergence judgment reference value preliminarily set close to zero and determining whether said second center value can be regarded as said evaluation value based on a comparative result, wherein said evaluation value represents a period for constraining a state of said production facility for a production process or preparatory work for said production process.

* * * * *